Nov. 11, 1952 L. A. MOORE 2,617,528
AUTOMATIC SHEET THROWOUT APPARATUS
Filed July 29, 1946 8 Sheets-Sheet 1

Inventor:
Lawrence A. Moore.
By Brown, Jackson, Boettcher & Diemer
Attys.

Nov. 11, 1952  L. A. MOORE  2,617,528
AUTOMATIC SHEET THROWOUT APPARATUS
Filed July 29, 1946  8 Sheets-Sheet 2
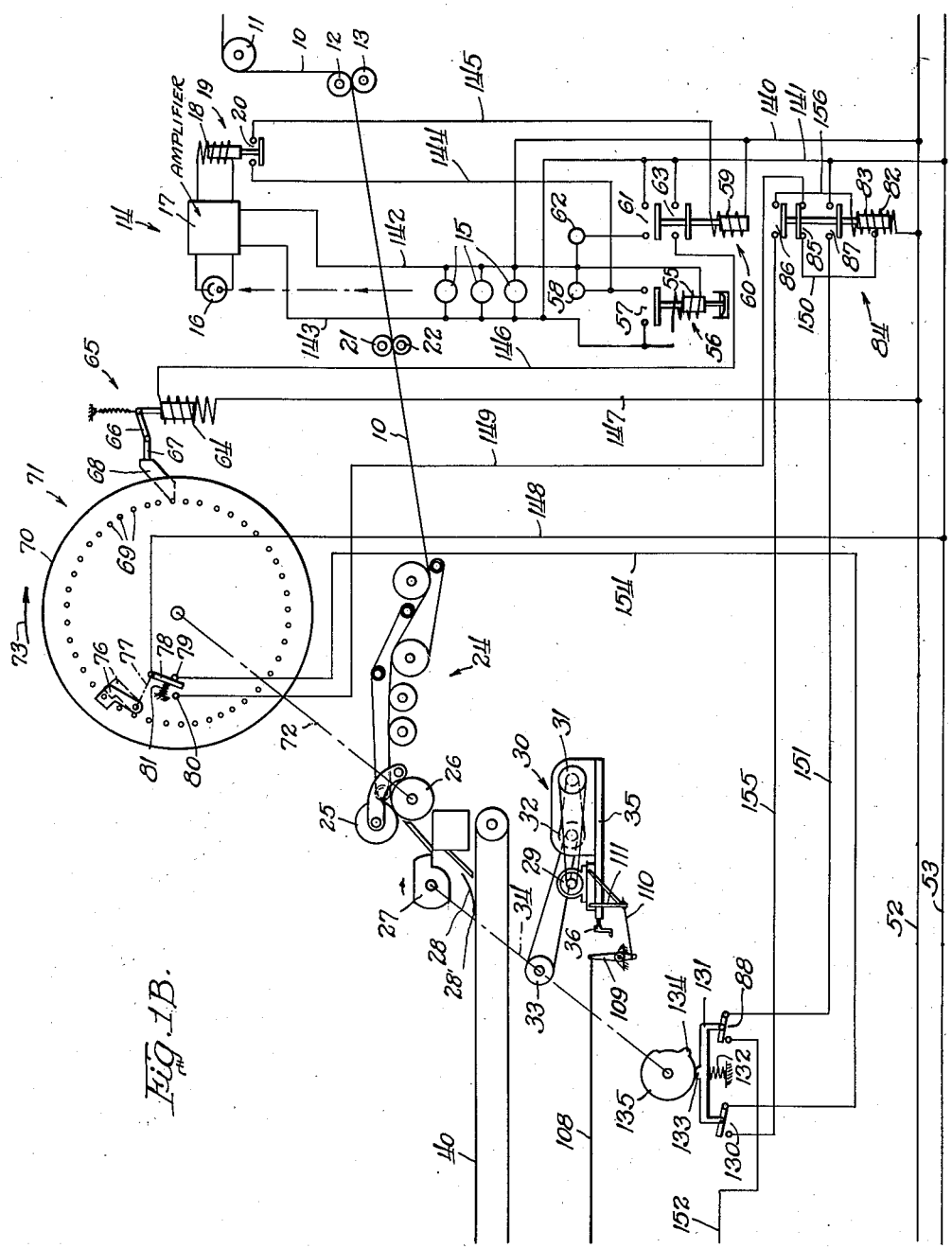

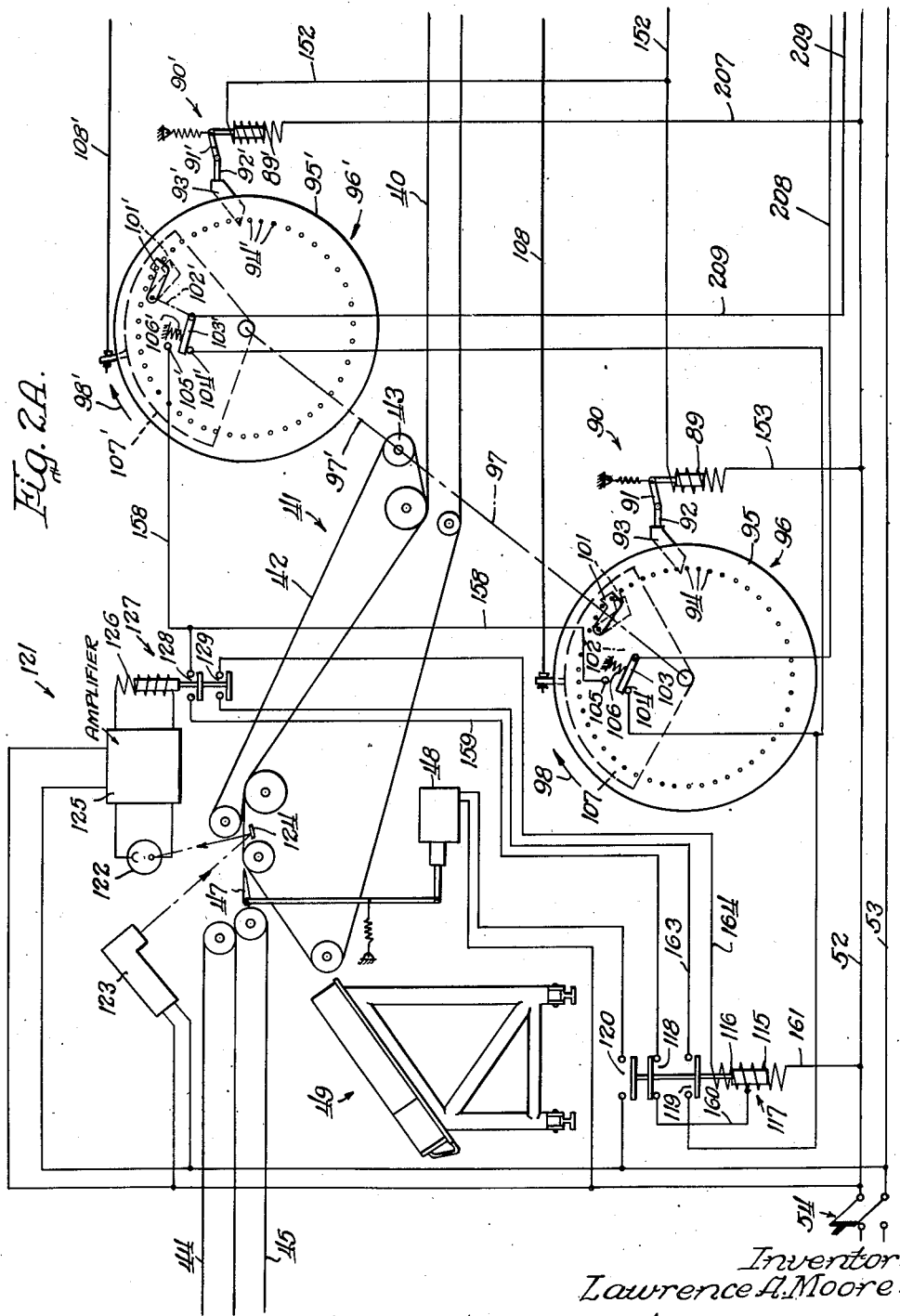

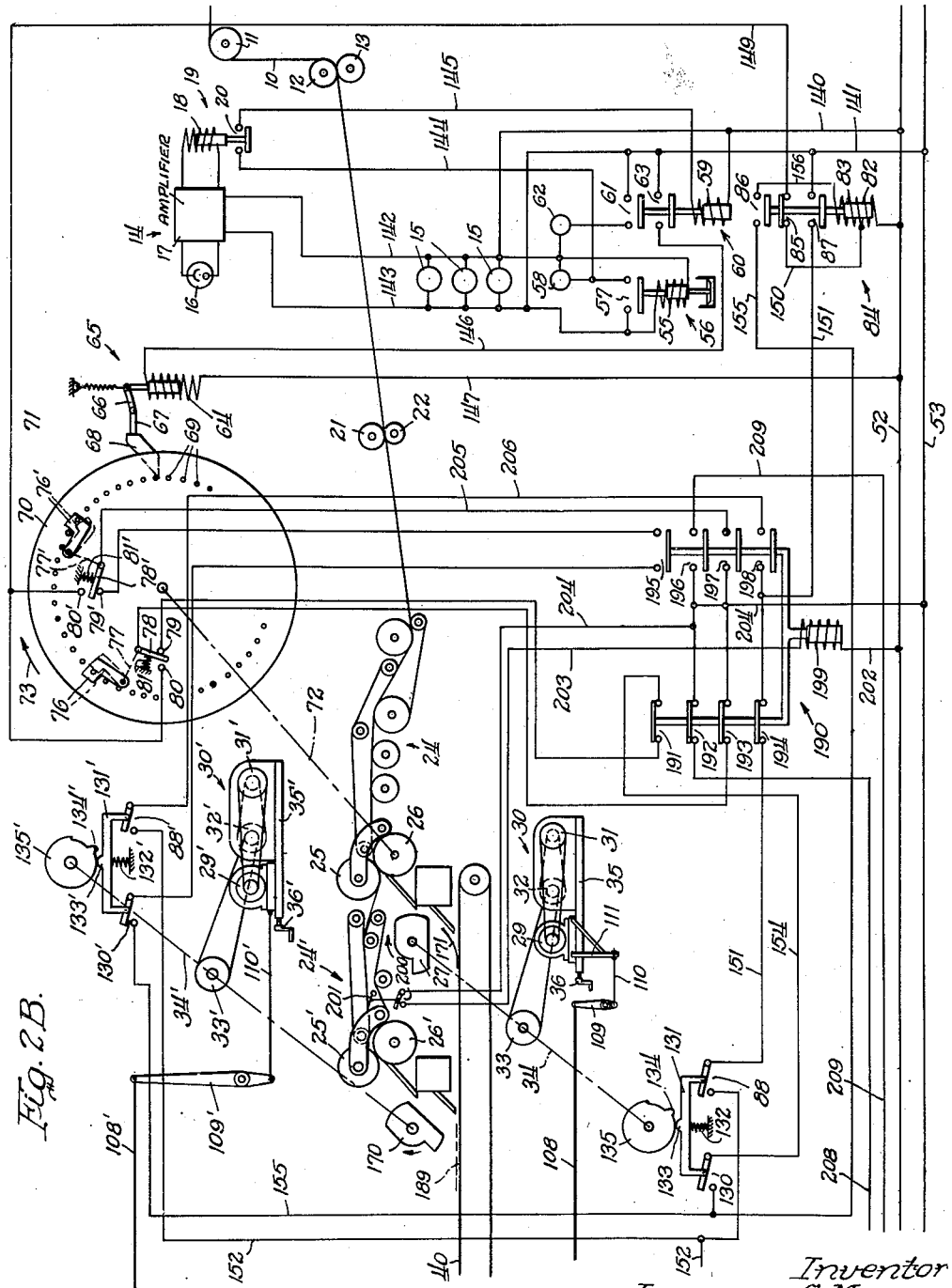

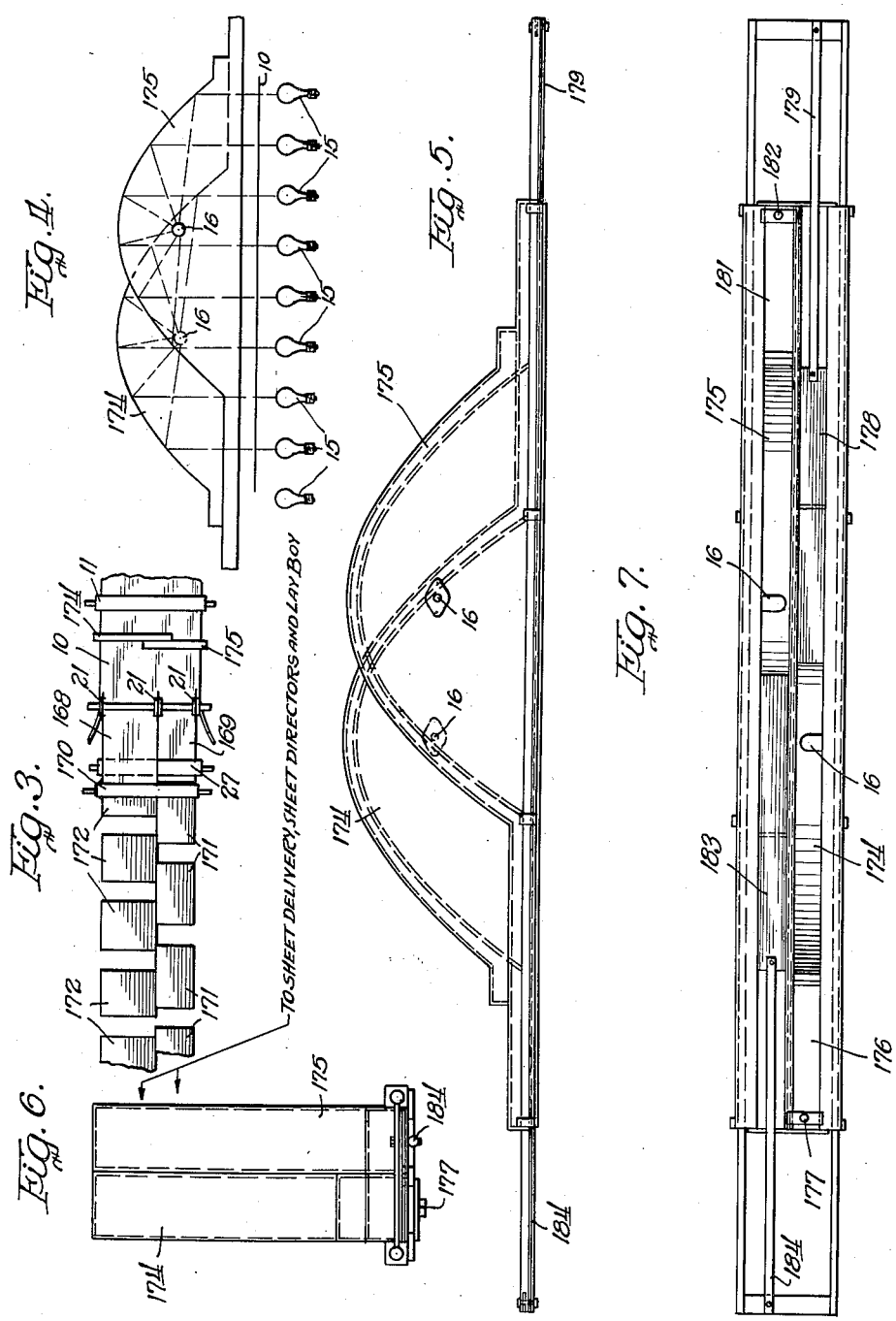

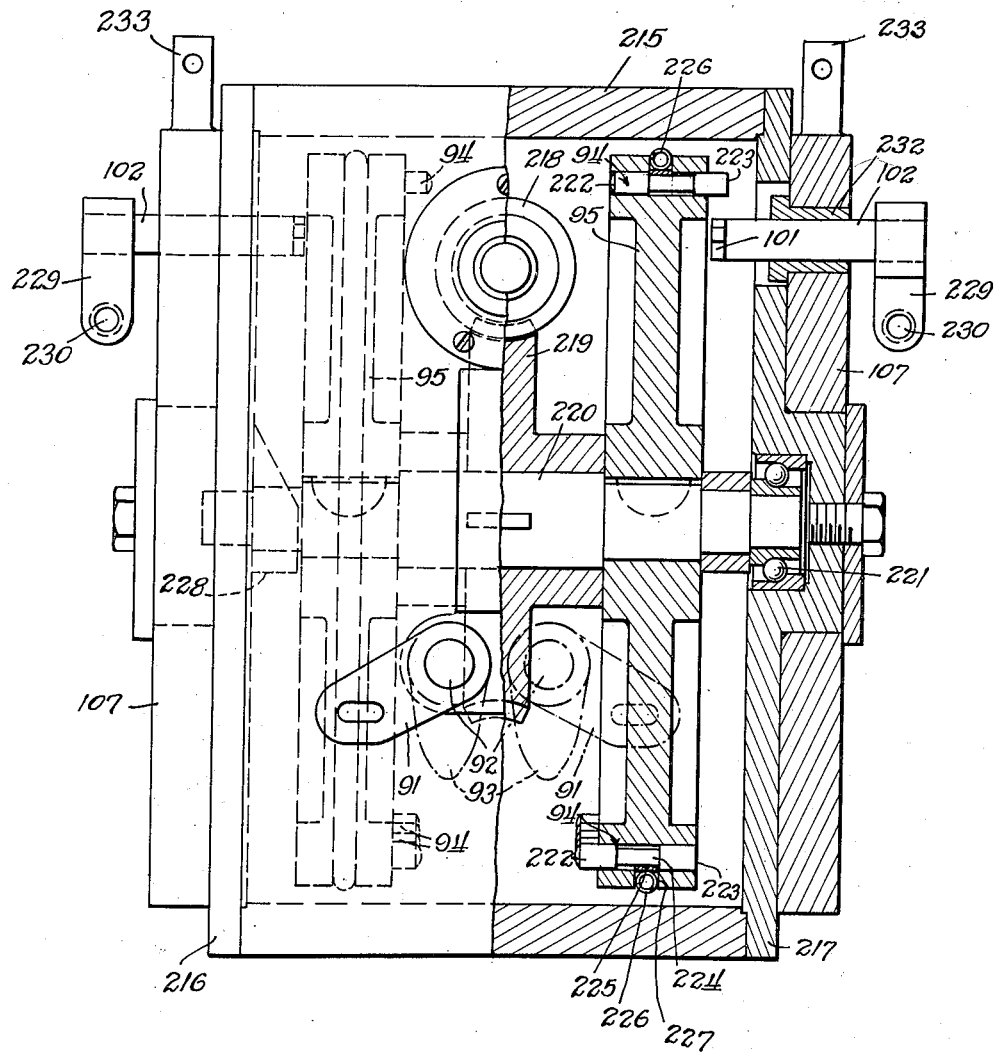

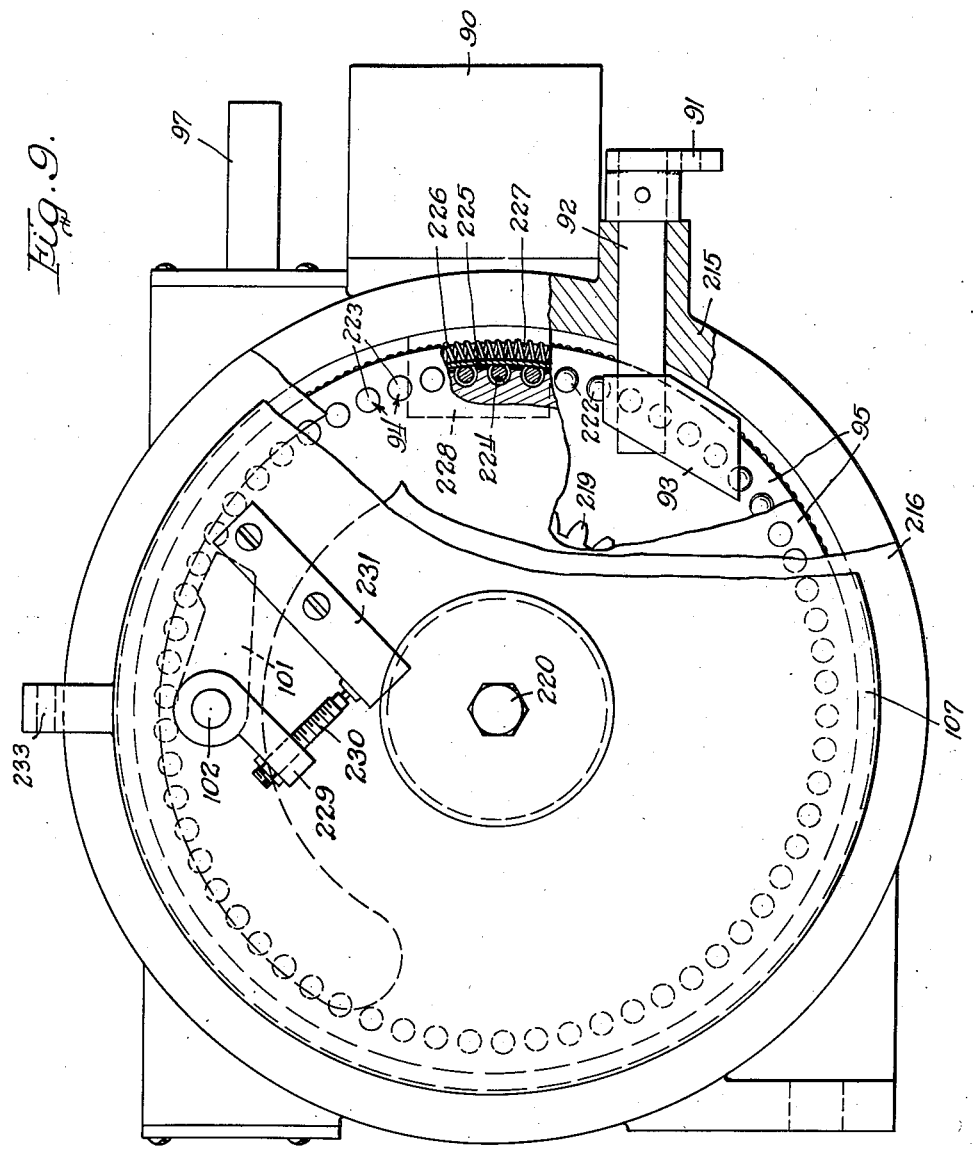

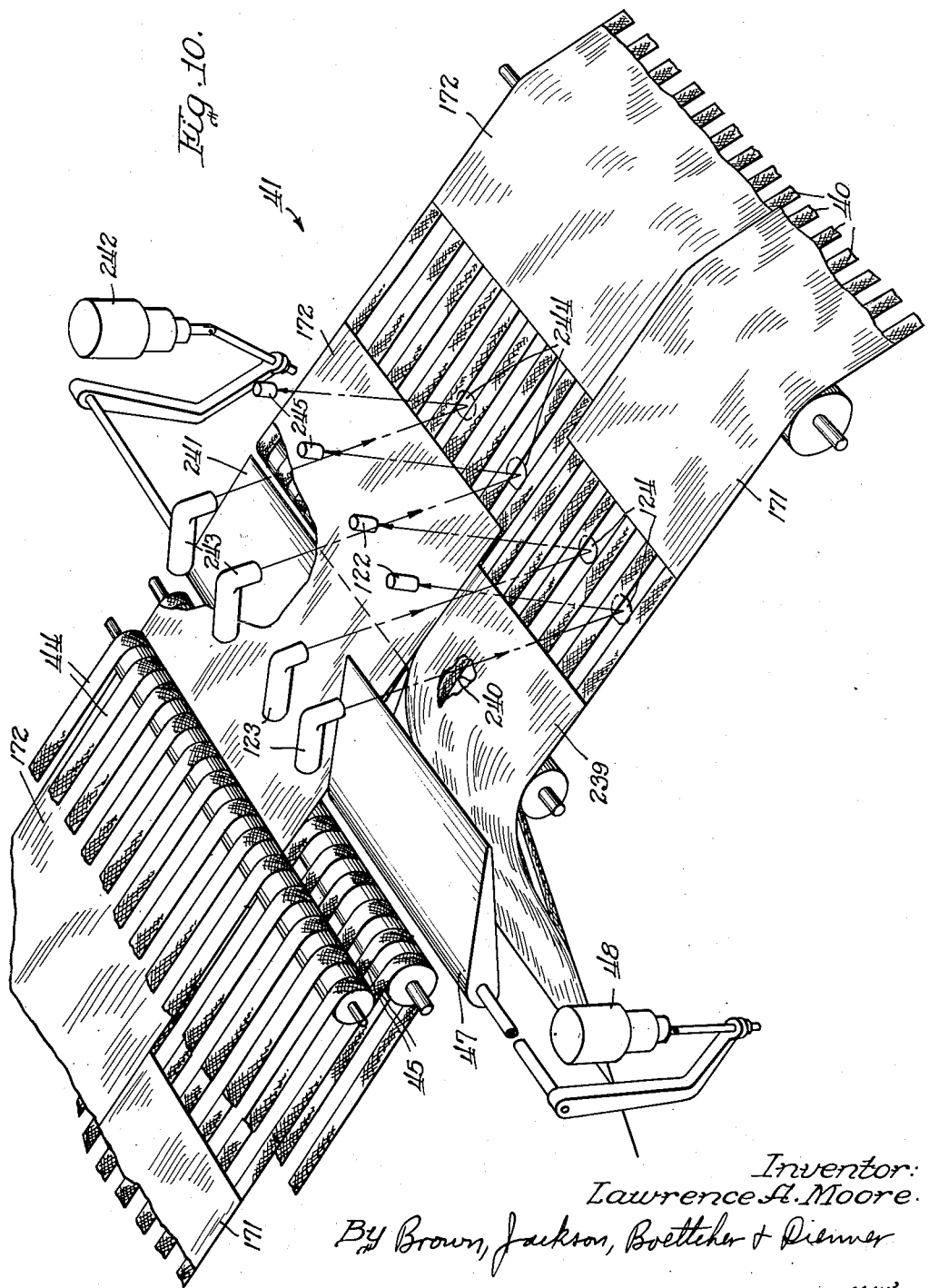

Patented Nov. 11, 1952

2,617,528

UNITED STATES PATENT OFFICE 2,617,528

AUTOMATIC SHEET THROWOUT APPARATUS

Lawrence A. Moore, Elkhart, Ind., assignor, by mesne assignments, to American Coating Mills Corporation, a corporation of Delaware Application July 29, 1946, Serial No. 686,838

20 Claims. (Cl. 209—111)

My invention relates, generally, to the handling of paper in web or strip and sheet form and it has particular relation to apparatus for detecting and automatically throwing out sheets containing defects, such as holes and ragged edges.

My present invention is particularly adapted for use with the sheet cutting and delivery means disclosed and claimed in my copending application Serial No. 566,559, filed December 4, 1944, now Patent Number 2,427,223, issued September 9, 1947, and assigned to the assignee of this application. It will be understood, however, that the present invention is not limited for use solely with such apparatus but that it may be used with other sheet cutting and delivery means. Reference may be had to my patent aforesaid for a more complete discription of certain of the sheet handling and delivery means which will be referred to briefly herein.

As pointed out in my patent aforesaid it is necessary to provide for handling continuously the sheets as they are cut from the web or strip since the latter is formed in a continuously operating paper making process. As long as the strip is being manufactured by the paper making process, it must be disposed of substantially without interruption. For this purpose means are provided for cutting the strip into two strips and then for individually cutting the two strips thus formed into sheets of the desired length which may be different for the sheets being cut from the two strips. The sheets are conveyed away from the knives by suitable carrier means and are piled on a lay boy. After the stacks on the lay boy have reached the desired heights, they are removed and prepared for further processing or shipment as the case may be.

It is desirable and in most cases it is essential that the sheets piled on the lay boy contain no defects such as holes or ragged edges. One reason for this is that sheets containing defects may injure or ruin the dies which are employed in processing the sheets into cartons, boxes and the like.

Of course, it is possible for the operators at the lay boy to examine each sheet for the presence of defects and to discard sheets containing the same. However, there is a limit to the speed at which sheets can be piled and examined visually by the operators. Moreover, the operators will quickly tire in case defects appear in several sheets one after the other.

It follows that it is desirable to provide some means which will detect the presence of a defect and as a result will discard the sheets containing the same. When it is recalled that the sheet handling apparatus must function continuously, it will be appreciated that specially designed apparatus must be employed for achieving this result.

Among the objects of my present invention: To detect the presence of a defect in the strip before it is cut to sheets and to discard automatically the sheet containing the defect; to employ light sensitive means to detect the defect; to register the defect on strip recording means; to register the sheet containing the defect on sheet recording means; to direct the sheet containing the defect by a sheet director to a throw out table; to operate the sheet director only in the space between adjacent sheets; to adjust the sheet recording means in accordance with the length of the sheet being cut; to cut the sheets from the strip by either of two knives arranged in tandem and to control the operation of the sheet director in accordance with the knife being used; and to feed a strip to each knife so as to cut two sheets at the same time and to control the operation of a throw out director individual to each knife.

Other objects of my invention will, in part, be obvious and in part appear hereinafter.

My invention is disclosed in the embodiments thereat shown in the accompanying drawings and it comprises the features of construction, combination of elements and arrangement of parts which will be exemplified in the constructions hereinafter set forth and the scope of the application of which will be indicated in the appended claims.

For a more complete understanding of the nature and scope of my invention reference can be had to the following detailed description taken in connection with the accompanying drawings in which:

Figures 1A and 1B taken together by placing the same end to end illustrate diagrammatically one embodiment of my invention in which the strip is fed to a single knife and only one sheet is cut at a time;

Figures 2A and 2B taken together by being placed end to end illustrate, diagrammatically, another embodiment of my invention in which the sheets can be cut by either of two knives aranged in tandem;

Figure 3 illustrates, diagrammatically, the simultaneous cutting of sheets from two strips by individual knives;

Figure 4 is a view which illustrates, diagrammatically, how a bank of lamps placed on one side of the strip can cooperate with light sensitive devices placed at the focal points of parabolic reflectors on the opposite side of the strip for detecting defects therein;

Figure 5 is a view, in side elevation, of the parabolic reflectors;

Figure 6 is a view, in end elevation, of the reflectors shown in Figure 5;

Figure 7 is a bottom plan view of the reflectors shown in Figure 5;

Figure 8 is a view, partly in front elevation and partly in section, showing the details of construction of the pin wheel assemblies;

Figure 9 is a view, partly in side elevation and partly in section, of the pin wheel assembly shown in Figure 8; and Figure 10 is a perpspective view of a portion of the carrier and shows how a sheet containing a defect is directed to a throw out table while a sheet containing no defect is delivered to the lay boy.

Figure 1A:
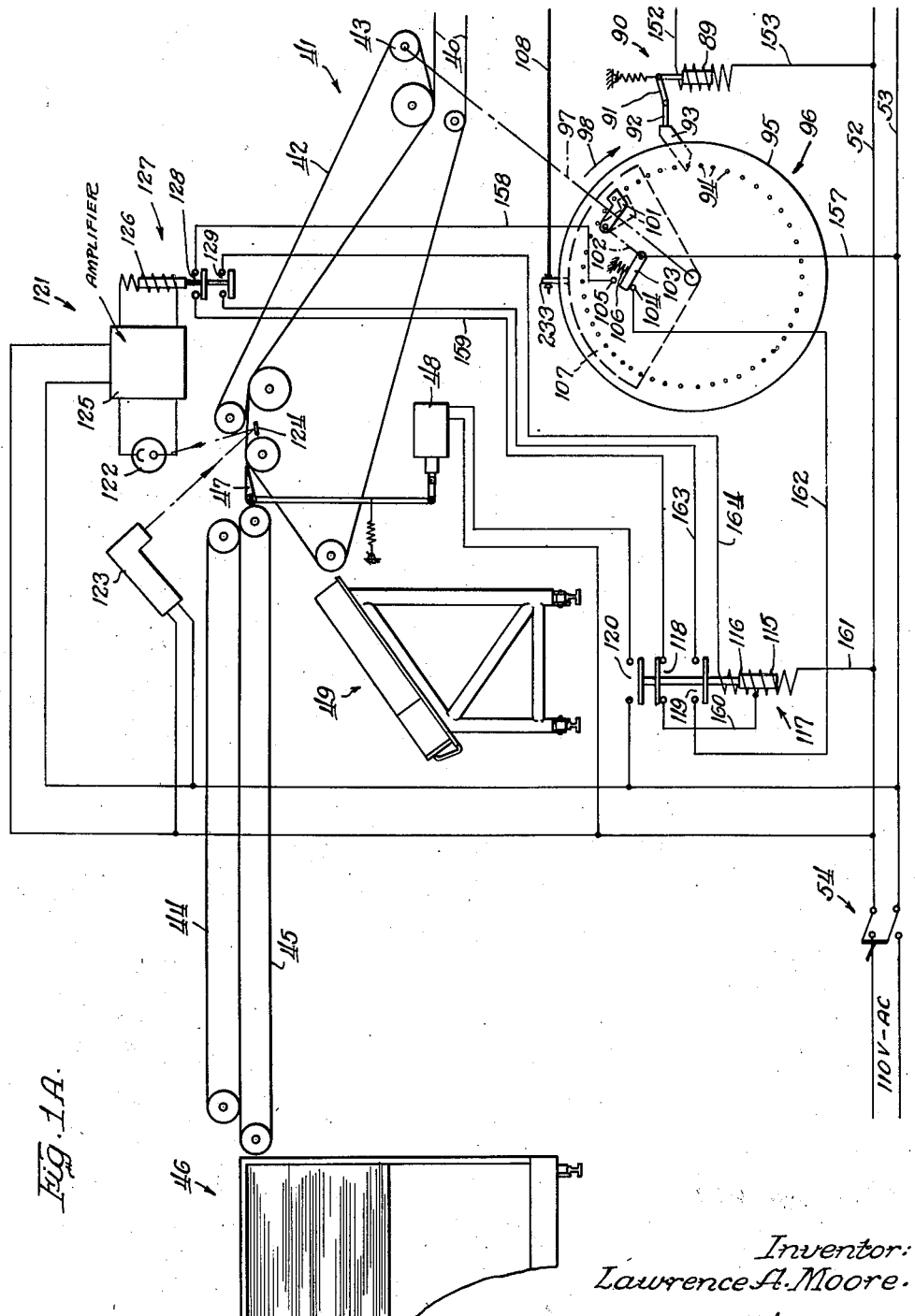

Referring now particularly to Figures 1A and 1B of the drawings, it will be noted that a web or strip 10 is fed over a calender roll 11 from the paper making machine and between guide rolls 12 and 13 past defect detecting means, illustrated generally at 14. The defect detecting means is provided to detect the presence of holes or ragged edges in the strip 10 which will thereafter appear in the sheets that are cut therefrom. It is the purpose of the present invention to ascertain the particular sheet in which the defect will appear and to provide for discarding the same.

The defect detecting means 14 may comprise a bank of incandescent lamps 15 which are disposed crosswise of the strip 10 and underneath the same. The light rays from the lamp 15 will pass through any holes that may be present in the strip 10 and will impinge upon a photo-cell 16. As will hereinafter appear, the photo-cell 16 is positioned at the focal point of a parabolic reflector so that it is unnecessary to employ more than one photo-cell 16 for each strip that is being cut. The photo-cell 16 is connected to an amplifier 17, which may be of conventional construction, whose output may be applied to an operating winding 18 of a defect detecting relay shown generally at 19 and having normally open contacts 20. It will be understood that the contacts 20 are closed each time that the light rays from the lamps 15 impinge upon the photo-cell 16 and that they remain closed as long as this condition continues to exist.

The strip 10 may be cut lengthwise by a slitter disc 21 that is located on top of the strip 10 and cooperates with a roller 22 positioned thereunder. As will hereinafter appear, three slitter discs 21 and three cooperating rollers 22 are employed for longitudinally cutting the strip 10. The outside discs trim the edges of the strip 10 while the middle or intermediate disc 21 is positioned so as to cut the strip 10 into the desired widths to form the sheets which are to be cut therefrom.

After the strip 10 is trimmed and cut, it is passed over knife feeding mechanism, shown generally at 24. In describing the invention as embodied in the construction illustrated in Figures 1A and 1B, it will be considered that only a single strip is fed to the knife feeding mechanism 24. As will appear hereinafter, two strips may be handled by it but, for present purposes, as indicated, only the feeding of a single strip will be considered.

The knife feeding mechanism 24 includes pull or draw rolls 25 and 26 between which the strip 10 is fed to a rotary knife 27 which severs the sheet as indicated at 28 from the strip.

The width of the sheets 28 is determined by the distance apart of the slitter discs 21. Their length is determined by the speed at which the knife 27 revolves. Since the strip 10 is fed to the knife 27 at a fixed speed, such as at a speed of 250 feet per minute, a longer strip will be obtained by reducing the speed of the knife 27 and a shorter sheet will be obtained by increasing its speed of rotation.

The rotary knife 27 may be driven by a motor 29 through a conventional Reeves variable speed drive that is illustrated, generally, at 30. The Reeves drive 30 includes pulleys 31 and 32 which are connected together by belts, pulley 31 being driven from the motor 29 and pulley 32 driving a pulley 33 mounted on a shaft 34 which carries the knife 27. The motor 29 may be slidably mounted on a base plate 35 and can be moved relative thereto by a manually operable crank 36. The arrangement is such that by variably positioning the motor 29 on the base plate 35, the driving ratio of the Reeves drive 30 is varied to effect corresponding variations in the speed at which the knife 27 is rotated. It will be understood that the Reeves drive 30 is of conventional construction and that other equivalent drives can be employed. Moreover, it will be understood that the motor 29 may be stationarily mounted on the base 35 and that provision may be made to obtain the speed variation between the pulleys 31 and 32. Since the variable speed drive is conventional and, per se, forms no part of the present invention, the details of its construction will not be set forth further herein. Of course, it will be understood that the manually operable crank 36 may be replaced by a remotely controlled motor drive and that a suitable indicator can be provided for the purpose of showing the length of the sheets 28 that are being cut by the knife 27 for any given speed thereof.

The sheets 28 may be conveyed away from the knife 27 by a belt 40 that forms a part of a carrier illustrated, generally, at 41. The belt 40 comprises a plurality of, such as sixteen, narrow belts, which serve to convey the sheets 28 as they are cut away from the knife 27 at a speed which is substantially higher than the speed at which the strip 10 is fed thereto. For example, the carrier 41 may be arranged to move the sheets 28 at a speed of 300 feet per minute. The carrier 41 includes a belt 42 which cooperates with the belt 40 and which passes over a delivery roll 43, the speed of rotation of which is a function of the speed of movement of the sheets 28.

The carrier 41 also includes delivery belts 44 and 45 between which the sheets 28 are conveyed to a lay boy that is indicated, generally, at 46.

A sheet director or throw out bar or blade 47 located between the conveyor belts 40—42 and 44—45 serves to direct the sheets 28 either to the lay boy 46 or, when operated by an electropneumatic operating mechanism 48, to a throw out table shown generally at 49. It will be understood that the sheet director 47 will normally occupy the position shown in Figure 1A of the drawings when the sheets 28 are to be conveyed to the lay boy 46. When a sheet containing a defect, such as a hole or a ragged edge, approaches the director 47, means are provided, as will be described in detail hereinafter, for energizing the mechanism 48 to operate the sheet director 47 so that the defective sheet will be directed to the throw out table 49 rather than being permitted to be conveyed by the belts 44—45 to the lay boy 46.

The strip slitting and conveying mechanism, the knife and the sheet handling mechanism briefly described hereinbefore are described in detail in my patent referred to hereinbefore. Accordingly, a more complete description thereof will not be set forth here.

For energizing the various relays and operating windings illustrated in Figures 1A and 1B of the drawings, a control bus comprising conductors 52 and 53 may be connected by a double pole switch 54 to a suitable source of alternating current, such as a 110 volt 60 cycle source. However, it will be understood that any other suitable control source can be employed such as other voltages or other frequencies or that a direct current source can be used. It will be understood that the present invention is described using a 110 volt 60 cycle source to provide the necessary control voltage.

On closure of the switch 54 conductors 52 and 53 are energized. An operating winding 55 of a time delay relay, shown generally at 56, is then energized and its normally open contacts 57 are closed at the expiration of the time for which the relay is set. This time delay is provided in order to permit the thermionic valve in the amplifier 17 to become heated to their operating temperatures before any attempt is made to initiate the function of the defect detecting system. One result of the closure of contacts 57 is to effect energization of an indicating lamp 58 which, by its continued energization, indicates that the time delay relay 56 is energized.

The closure of contacts 57 also completes an energizing circuit before an operating winding 59 of a control relay, shown generally at 60, provided that contacts 20 of the defect detecting relay 19 are closed as a result of the detection of a defect in strip 10. The control relay 60 has normally open contacts 61 which, when closed, energize an indicating lamp 62 which, by its being lighted, indicates that the control relay 60 is energized and that a defect is in the process of being detected.

The control relay 60 also has normally open contacts 63 which are arranged to complete an energizing circuit for an operating winding 64 of an electromagnet which is indicated, generally, at 65. The electromagnet 65 is operatively connected through a link 66 and a shaft 67 to rock a cam 68 for depressing one or more pins 69 that are carried near the periphery of a pin wheel 70. The pin wheel 70 and the electromagnet 65 comprise what may be herein termed as strip recording means that is indicated, generally, at 71. The presence of a defect in the strip 10 is recorded on the strip recording means 71 by the depression of one or more pins 69. The details of construction of the pin wheel 70 will be set forth hereinafter. For present purposes a general description will suffice.

The pin wheel 70 is connected to be mechanically driven, as indicated at 72, by pull roll 26 in a direction indicated by the arrow 73. It will be understood that suitable reduction gearing is provided between the pull roll 26 and the pin wheel 70 and that the mechanical connection 72 is merely a diagrammatic representation of this mechanical interconnection. It is important to note here that the pin wheel 70 is driven at a speed which corresponds to the speed at which the strip 10 is fed to the knife 27.

The pin or pins depressed by the cam 68 serve to actuate a cam 76 that is arcuately spaced from the cam 68 a distance which corresponds to the distance that the defect, such as a hole, in the strip 10 travels after it is detected by the photo-cell 16 to the point where the blade 27 will cut off the sheet 28 which will contain the defect. The cam 76 is rockably mounted with a shaft 77 for rocking a movable contact 78 out of engagement with a stationary contact 79 and into engagement with another stationary contact 80. A spring 81 serves to bias the movable contact 78 and the cam 76 to the positions shown by the full lines in Figure 1B.

In operation of the cam 76 the record of the defect previously applied to the strip recording means 71 is transferred to a holding relay by energization of a portion 82 of operating winding 83, the relay itself being indicated, generally, at 84. The relay 84 is what is conventionally known as a mechanically held alternating current relay. Once its winding 82 is energized the armature thereof is moved to an alternate position and normally closed contacts 85 are opened to open the energizing circuit to the winding 82. The construction of the relay is such that it is mechanically held in the closed position by the residual magnetism in its armature. A relay of this type is manufactured by Allen-Bradley Company and is identified as Bulletin 700-Type BM mechanically held alternating current relay. The functioning of this relay is described in detail in Wilms et al. Patent No. 2,297,339. The relay 84 includes normally open contacts 86 which, when closed, serve to prepare an energizing circuit for the complete winding 83 for effecting deenergization of the relay. The relay 84 also includes normally open contacts 87 which complete a circuit through control contacts 88 to energize a winding 89 of an electromagnet which is shown, generally, at 90. The electromagnet 90 is similar to the electromagnet 65 and is arranged to operate through a link 91 and shaft 92 to rock a cam 93 for depressing one or more pins 94 which are located near the periphery of a pin wheel 95. The pin wheel 95 and electromagnet 90 together may be termed as sheet recording means and are indicated, generally, at 96. The sheet recording means 96 is provided to record the particular sheet or sheets containing a defect or defects and which sheet or sheets should be discarded by operation of the sheet director 47. The pin wheel 95 is mechanically connected, as indicated at 97, to the delivery roll 43 so that it rotates at a speed which is a function of the speed at which the sheets 28 are conveyed away from the knife 27. It will be understood that a suitable gear reduction mechanism may be provided between the delivery roll 43 and the pin wheel 95 and that the mechanical connection indicated at 97 is diagrammatic only. The connection is such that the pin wheel 95 rotates as indicated by the arrow 98.

Arcuately spaced from the cam 93 is a cam 101 which is arranged to be rocked by the depressed pin or pins and through a shaft 102 to rock a movable contact 103 out of engagement with a stationary contact 104 and into engagement with a stationary contact 105. A spring 106 serves to bias the movable contact 103 and likewise the cam 101 to the positions shown by the full lines in Figure 1A of the drawings.

It is desired that the arcuate distance between the cam 93 and the cam 101 correspond to the length of the sheet 28 being cut. This can be accomplished by varying the relative positions of the cams 93 and 101 in accordance with the speed at which the knife 27 is rotated by the motor 29. In order to adjust the position of the cam 101 with respect to the cam 93, the former, together with the movable contacts 103 and stationary contacts 104 and 105 is mounted on a plate 107, a sector shaped portion of which is shown, and it is arranged to be mechanically connected by a rod 108, or other suitable means, to a lever 109 which may be connected by a link 110 and a frame 111 to be moved on movement of the motor 29. Thus when the position of the motor 29 is shifted to vary the speed of the knife 27, a corresponding movement of the plate 107 takes place to effect a corresponding shift in the arcuate distance between the cams 93 and 101. It will be obvious that other suitable mechanical connections can be provided to the plate 107 so that its position will be controlled in accordance with the adjustment of the Reeves drive 30, the particular arrangement shown and described being for illustrative purposes only.

When the cam 101 is operated an energizing circuit is partly completed at stationary contacts 105 for energizing the portion 115 of a winding 116 which comprises the operating winding of a mechanically held relay indicated, generally, at 117. The relay 117 is similar to the mechanically held relay 84, previously referred to. It includes normally closed contacts 118 which serve to open the energizing circuit for the winding 115 and normally open contacts 119 which serve to partly complete an energizing circuit for the full winding 116. The relay 117 also includes normally open contacts 120 which, when closed, serve to energize the operating winding of the electropneumatic operating mechanism 48.

As previously indicated, it is desired that the mechanism 48 not be energized to move the sheet director 47 except when it can be moved in the space between adjacent sheets. The reason for this is to prevent operation thereof while a sheet is passing over it so as to prevent jamming of the mechanism.

It is for this purpose that space detecting means, shown generally at 121, are provided. The space detecting means 121 comprises a photo-cell 122 on which light rays can impinge from a light source 123 as reflected by a mirror 124. The mirror 124 is positioned below the sheet as it is conveyed to the sheet director 47 and thus is masked thereby except for the space between the ends of successive sheets. It will be apparent that the light rays from the source 123 will impinge upon the photocell 122 only when the space between adjacent sheets registers with the mirror 124.

The photo-cell 122 controls the operation of a thermionic amplifier 125 whose output is applied to an operating winding 126 of a space detecting relay that is shown, generally, at 127. The relay 127 includes normally open contacts 128 which must be closed to complete the energizing circuit for the winding 115. Since they are closed only while the space between adjacent sheets registers with the mirror 124, it will be understood that the sheet director control relay 117 will be operated only during this interval to effect operation of the sheet director 47. Likewise, normally open contacts 129 are provided on the space directing relay 127 to permit energization of the full winding 116 for deenergizing the relay 117 and operating the sheet director 47 back to the position shown in Figure 1A of the drawings.

Since the operation of the sheet director control relay 117 is initiated by operation of the cam 101 and it is necessary to effect energization of the space detecting relay 127 before the relay 117 can be operated, particular attention must be paid to the positioning of the cam 101 with respect to the cam 93. As indicated hereinbefore the arcuate spacing therebetween is controlled in accordance with the speed of rotation of the knife 27. It may now be pointed out that this arcuate distance for any particular speed of the knife 27 corresponds to the distance between the leading edge 28' of the sheet 28 just cut by the knife 27 and the reflected light rays from the mirror 124 less about one foot. This adjustment insures that a circuit will be completed through stationary contact 105 just prior to the instant that the mirror 124 is unmasked by the sheet immediately preceding the sheet containing a defect so that the functioning of the sheet director 47 can be initiated as soon as the space detecting relay 127 is energized for that particular space, it being understood that the space detecting relay 127 is energized each time that the mirror 124 is unmasked.

In order to effect deenergization of the holding relay 84 normally open contacts 130 are provided. These contacts are arranged to be operated by an operating bar 131 that is common to these contacts as well as to contacts 88. The arrangement is such that contacts 88 are closed a short interval before contacts 130 are closed. The operating bar 131 is biased upwardly by a spring 132 to open the contacts 88 and 130. The bar 131 has a projection 133 that is arranged to be engaged by a projection 134 from a circular cam 135 that is mounted for rotation with the knife 27. As indicated, it may be mounted on an extension of the shaft 34. The cam 135 is so adjusted that it effects the closure of contacts 88 at the instant after the knife 27 cuts off the sheet 28 containing the defect.

In operation, on closure of switch 54, conductors 52 and 53 are energized, as previously described. At the same time over conductors 140 and 141, connected to conductors 52 and 53, conductors 142 and 143 are energized to energize lamps 15, amplifier 17 and winding 55 of the time delay 56. After the time for which the relay 56 is set, its contacts 57 are closed and indicating lamp 58 is lighted. Energization of conductors 52 and 53 also results in energization of the amplifier 125 of the space detecting means 121.

As long as the strip 10 contains no defects, such as holes or ragged edges, the light rays from the lamps 15 are prevented from impinging on the photo-cell 16 and defect detecting relay 19 remains deenergized. The strip 10 is fed to the knife 27 and sheets 28 are cut therefrom. Sheets are conveyed by the carrier 41 past the sheet director 47, which occupies the position shown in Figure 1A of the drawings, to the lay boy 46. Since the sheets are conveyed away from the knife 27 at a speed which is higher than that at which the strip 10 is fed to the knife 27, there will be a space between successive sheets. The mirror 124 is unmasked as each of these spaces appear and, as previously described, the space detecting relay 127 is operated for each of these spaces.

Assuming now that a defect, such as a hole, is present in the strip 10 as it moves between the lamps 15 and the photocell 16, the light rays from the former will impinge upon the latter and defect detecting relay 19 will be operated to close its contacts 20. These contacts will remain closed as long as the light rays from the lamps 15 continue to impinge upon the photo-cell 16.

The closure of contacts 20 completes a circuit for energizing winding 59 of control relay 60 which may be traced from energized conductor 143 through contacts 57, conductor 144, contacts 20, conductor 145, winding 59, to energized conductor 140.

As a result of the energization of winding 59, contacts 61 are closed to complete an obvious energizing circuit for the indicating lamp 62. At contacts 63 a circuit is completed for energizing winding 64 of the electromagnet 65 which may be traced from the energized conductor 141 through contacts 63, conductor 146, winding 64, and conductor 147 to energized conductor 52.

Cam 68 is rocked by the electromagnet 65 to depress one or more of the pins 69 in the pin wheel 70 as the same is rotated past the cam 68. As long as the winding 64 is energized, the cam 68 will be rocked to depress the pins 69. Means are provided, as will appear hereinafter, for resetting the pins 69 just prior to their arriving at the position where they can be depressed by the cam 68. Obviously, the number of pins depressed at any one time will be determined by the length of time that the control relay 60 is energized and that this in turn will depend upon the extent of the defect in the strip 10. For present purposes it may be assumed that the defect comprises a single hole in the strip 10 and that only one of a few of the pins 69 are depressed. As soon as the lamps 15 are masked, light therefrom no longer impinges on the photo-cell 16 and relay 19 is deenergized. Control relay 59 is deenergized, indicating lamp 62 is extinguished, and winding 64 is deenergized. However, the record of the defect is registered on the strip recording means 71 and it is translated into a movement of the cam 76 by the depressed pin or pins engaging the same. Movable contact 78 is operated to engage stationary contacts 80 for completing a circuit to energize winding 82 of the holding relay 84.

The circuit for energizing winding 82 may be traced from energized conductor 53 through conductor 148, movable contact 78, stationary contact 80, conductor 149, closed contacts 85, conductor 150, and winding 82 to energized conductor 52. Immediately upon energization of winding 82, contacts 85 are opened and this winding is deenergized. However, because of the characteristics of the magnetic circuit of this relay, previously referred to, it remains in the operated position until the complete winding 83 is subsequently energized.

At contacts 87 an energizing circuit is completed for energizing winding 89 of electromagnet 90 which forms a part of the sheet recording means 96. This circuit extends through contacts 88 which, it will be recalled, are closed at the instant that the knife 27 cuts the sheet containing the defect from the strip 10.

This circuit may be traced from energized conductor 141 through contacts 87, conductor 151, contacts 88, conductor 152, winding 89 and conductor 153 to energized conductor 52.

In the meantime movable contact 78 has been returned to engagement with stationary contact 79. As a result, on closure of contacts 130, a circuit is completed for energizing the full winding 83 of the holding relay 84. This circuit may be traced from energized conductor 53 through conductor 148, movable contact 78, stationary contact 79, conductor 154, contacts 130, conductor 155, closed contacts 86, conductor 156 and winding 83 to conductor 52. Holding relay 84 is, thereupon, deenergized, its contacts 87 are opened and winding 89 is deenergized.

The defect, previously registered on the holding relay 84, is now transferred to the sheet recording means 96 on operation of cam 93 to depress one or more of the pins 94. In the meantime, the sheet 28 containing the defect is travelling from the knife 27 toward the sheet director 47. At the time that its leading edge is about one foot away from the reflected beam from the mirror 124, cam 101 is rocked by the depressed pin to move contact 103 into engagement with contact 105 for partially completing an energizing circuit for winding 115 of sheet director control relay 117. This circuit is completed at contacts 128 at the instant that the mirror 124 is unmasked by the sheet immediately preceding the sheet which contains the defect.

The circuit for energizing winding 115 may be traced from energized conductor 53 through conductor 157, movable contact 103, stationary contact 105, conductor 158, contacts 128, conductor 159, break contacts 118, conductor 160, winding 115 and conductor 161 to energized conductor 52.

Relay 117 is energized and at contacts 118 the energizing circuit for winding 115 is opened. Moreover, because of the characteristics of the magnetic circuit of this relay, it remains in the energized condition until the armature is demagnetized by energization of the complete winding 116.

The energization of relay 117 closes contacts 120 and completes an obvious energizing circuit for the electropneumatic operating mechanism 48. The sheet director 47 is operated to the throw out position and the sheet containing the defect is directed to the throw out table 49. Since it has been assumed that the defect occurs in a single sheet only, it is desired that the sheet director 47 be returned to the position shown in Figure 1A of the drawings before the next sheet, which may be assumed to be a perfect sheet, passes the sheet director 47. However, it is necessary to prevent operation of the director 47 back to the normal position until it can be accomplished in the space between the trailing edge of the sheet just thrown out and the leading edge of the next sheet.

Under the assumed conditions the cam 101 will have been restored to its normal position by the spring 106 and movable contact 103 will engage stationary contact 104. As soon as the space just referred to appears, space detecting relay 127 will be energized and contacts 129 will be closed to complete energizing circuit for the winding 116.

This energizing circuit can be traced from energized conductor 53 through conductor 157, movable contact 103, stationary contact 104, conductor 162, contacts 119, conductor 163, contacts 129, conductor 164, winding 116, and conductor 161 to energized conductor 52. The armature of relay 117 is thereupon demagnetized by the alternating current and the contacts thereof are restored to the positions shown in Figure 1A of the drawings.

As long as no defects are detected by the defect detecting means 17 the sheets will continue to be delivered to the lay boy 46. However, on the occurrence of another defect, the foregoing cycle of operations will be repeated and the sheet containing the same will be discarded to the throw out table 49. In the event that the defect appears in successive sheets, for example, when a tear extends through several sheets, the sheet director 47 will remain in the operated position to throw out successively the imperfect sheets and will not be returned to the normal position until a perfect sheet is fed thereto.

The description of the system illustrated in Figures 1A–1B has proceeded on the assumption that the strip 10 is trimmed to provide a single strip of the desired width and that a single knife 27 is provided for cutting the same into sheets. In order to speed up production and to permit the cutting of sheets of different lengths and different widths at the same time, the sheet 10, as illustrated in Figure 3, can be cut by three slitter discs 21 into two strips 168 and 169. These strips may be termed, respectively, the back strip and the front strip. By adjusting the position of the intermediate slitter disc 21, it is possible to vary the relative widths of the strips 168 and 169.

The front strip 169 may be cut by the knife 27, previously referred to, and now identified further as the back knife. The back strip may be cut by a front knife 170, which is located in tandem with the back knife 27. The knives 27 and 170 are arranged to cut sheets 171 and 172, respectively, from the strips 169 and 168. It will be noted that the sheets 171 and 172 are of different widths. This, it will be recalled, is controlled by the position of the intermediate slitter disc 21. The length of each of the sheets 171 and 172 is controlled by the speed at which the respective knives 27 and 170 rotate since the strips 169 and 168 are fed thereto at a constant speed. In this manner it is possible to control both the width and the length of the individual sheets 171 and 172.

In order to detect the presence of defects in the sheets 171 and 172 it is necessary to provide defect detecting means individual thereto. For this purpose, as illustrated in Figure 3, two parabolic reflectors 174 and 175 are provided, each being individual to the portions of the strip 10 that are cut into the strips 168 and 169. They are located as far in advance of the knives 27 and 170 as is conveniently possible so as to provide a maximum amount of time for initiating the functioning of the control operations as the result of the detection of a defect.

As illustrated more fully in Figure 4 of the drawings, the parabolic reflectors 174 and 175 are located above the strip 10 and the lamps 15 are located below the same. Obviously their positions could be reversed without departing from the invention. Two photoelectric cells 16 are provided, one for each of the reflectors 174 and 175 and they are located at the focal points thereof. Thus, light rays passing through an aperture in the strip 10 underneath either of the reflectors 174 or 175 at any position along its length will be reflected onto the individual photo-cell 16. In this manner only a single photo-cell 16 is required for each of the reflectors 174 and 175 rather than requiring a plurality of them if such an arrangement were not employed.

The details and construction of the reflectors 174 and 175 are illustrated more clearly in Figures 5, 6 and 7 of the drawings. As there shown, the two reflectors 174 and 175 are formed in a unitary construction with a substantial degree of overlap so as to permit the cutting of relatively narrow front strips and relatively wide back strips and vice versa. It is desired that the apertures to the reflectors 174 and 175 correspond to the width of the strips 168 and 169 individual thereto that are being cut by the cutter discs 21. For this purpose, as shown in Figure 7, the reflector 174 is provided at its left hand end with an adjustable slide 176 which may be secured in position by a set screw 177. At the other end there is provided a relatively long slide 178 the position of which may be controlled by a rod 179. The slides 176 and 178 are located in suitable grooves in the underside of the reflector 174 so as to permit relative movement. Likewise the reflector 175 has a short slide 181 that may be held in place by an adjusting screw 182. It also has a relatively long slide 183 which is adjustable by a rod 184. The slides 176 and 178 of the reflector 174 and the slides 181 and 183 of the reflector 175 are adjusted in accordance with the widths of the strips 168 and 169 so as to correspond substantially thereto with a slight overlap at the ends of the relatively long slides 178 and 183. By these means the photo-cells 16 individual to the reflectors 174 and 175 are enabled to detect defects which will eventually appear in either of sheets 172 or 171. In this manner it is possible to select the particular sheet of the two sheets being cut in the different strips which should be discarded. The manner in which this is accomplished will be set forth in detail hereinafter.

If the back strip 168 were always cut on the front knife 170 and the front strip 169 were always cut on the back knife 27, automatic defect detecting means could be provided by using the system illustrated in Figures 1A–1B in duplicate. After the strip 10 is cut by the cutter discs 21, there is no necessary correlation betwen the handling of the strips 168 and 169 thereafter.

However, it is desired that provision be made for cutting the back strip 168 on either the front knife 170 or the back knife 27. Likewise, it is desired that provision be made for cutting the front strip on either the back knife 27 or the front knife 170. By such provision the flexibility of the strip and sheet cutting and handling means is greatly increased. However, because of the different relative locations of the back and front knives 27 and 170 with respect to the reflectors 174 and 175 and the sheet directors 124, one of which is provided for each of the two sheets being cut simultaneously, it is necessary to modify the system shown in Figures 1A and 1B and to provide certain additional duplicate equipment to permit the use of either of the knives 27 or 170 for cutting either the front strip 169 or the back strip 168 as the case may be.

Accordingly, reference may now be had to Figures 2A–2B of the drawings. It will be understood that the apparatus there shown is for use with the front strip 169, for example, for permitting the same to be cut either by the back knife 27 or the front knife 170. When the strip is being cut by the back knife 27, the sheets cut thereby may be indicated by the reference character 171 which was used in Figure 3 of the drawings. Now when the same strip is fed to the front knife 170 so that it is cut thereby, rather than by the back knife 27, the sheets then cut may be indicated by the reference character 189 as applied to the broken line.

For detecting the presence of a defect in the sheets cut from the back strip 168, it will be understood that a duplicate of the apparatus shown in Figures 2A–2B is employed beginning with the defect detecting means 14 and continuing on through to the control of the sheet director 47 individual thereto. Since the apparatus and circuits for the back strip are identical with the apparatus and circuits for the front strip, it is considered unnecessary to illustrate and describe this duplicate apparatus herein.

In so far as possible in Figures 2A-2B where the additional apparatus to accommodate the front knife 170 is employed, the same reference characters that were previously used for the same apparatus are used with a prime in order to indicate the similarity.

At the outset it is pointed out that, when the strip 10 is cut by the back knife 27, the apparatus and circuits are identical with those illustrated in Figures 1A-1B and described hereinbefore. When the strip 10 is cut by the front knife 170, the additional duplicate apparatus is required as will now be described.

In order to feed the strip 10 to the front knife 170, the knife feeding mechanism 24' is employed which corresponds, generally, to the knife feeding mechanism 24. Instead of the strip 10 being fed to the back knife 27, it extends through the mechanism 24' and between pull or draw rolls 25' and 26'.

The front knife 170 may be individually driven by a motor 29' through a Reeves variable speed drive 30'. It will be understood that a single motor 29 may be provided for driving both of the knives 27 and 170 by employing two Reeves variable speed drive mechanism driven from the single motor. However, for illustrative purposes two separate motors 29 and 29' are shown. The motor 29' drives through pulleys 31' and 32' and pulley 33' mounted on a shaft 34' to which the knife 170 is mechanically connected. The motor 29' can be shifted relative to the base 35' by a crank 36'.

A cam 135' is driven in synchronism with the speed of the front knife 170 for operating switches 88' and 130'. These switches have the same function as the switches 88 and 130 which are operated by the cam 135.

Since the front knife 170 is spaced further away from the fault detecting means 14 than is the back knife 27, it is necessary to provide a cam 76' on the strip recording means 71 which is arcuately spaced from the cam 76 by a distance which corresponds to the distance between the knives 27 and 170. Since the strip 10 is fed to either the knife 27 or the knife 170 at the same speed, the pin wheel 70 can be driven from either the pull roll 26 or the pull roll 26'. As shown in the drawings, it is driven from the pull roll 26. The cam 76' is operated in the same manner as is the cam 76 for moving a movable contact 78' out of engagement with a stationary contact 79' and into engagement with another stationary contact 80'.

Referring to Figure 2A it will be noted that a second pin wheel 95' forming a part of sheet recording means 96' is employed in conjunction with the front knife 170. The sheet recording means 96' comprises elements which are a duplicate of the elements making up the sheet recording means 96. It will be noted that the shiftable plate 107' is connected by a rod 108' to a lever 109' whose position is controlled in accordance with the position of the motor 29' so as to position the plate 107' in accordance with the speed at which the front knife 170 is driven and thereby in accordance with the length of the sheet 189 being cut thereby.

With a view to transferring from the control apparatus associated with back knife 27 to the control apparatus associated with the front knife 170 for shifting the defect detecting apparatus from one to the other, a transfer relay, shown generally at 190, is employed. The transfer relay 190 may include normally closed contacts 191, 192, 193 and 194 and normally open contacts 195, 196, 197 and 198. It also includes an operating winding 199 the energization of which may be controlled by a switch 200. The switch 200 is normally in the open position when the strip 10 is being fed to and cut by the back knife 27. However, when it is fed to the front knife 170, a finger 201, attached to the contacts 200 is depressed to close the same and complete a circuit for energizing operating winding 199. It will be understood that the operation of the transfer relay 190 shifts the control of the sheet director 47 from the cam 76 of the strip recording means 71 to the cam 76'; from the cam 135 and associated switches 88 and 130 to the cam 135' and associated switches 88' and 130'; and from the sheet recording means 96 to the sheet recording means 96'.

As previously described, when the strip 10 is cut by the back knife 27 the circuits are as illustrated in Figures 1A-1B. Accordingly, a detailed description of the functioning of the apparatus shown in Figures 2A-2B with the strip 10 being cut by the back knife 27 will not be set forth herein.

It will be assumed that the strip 10 is being cut by the front knife 170. Accordingly, finger 201 is depressed and contacts 200 are closed to complete an energizing circuit for operating winding 199 of the transfer relay 190.

This circuit may be traced from energized conductor 52 through conductor 202, winding 199, conductor 203, contacts 200, and conductor 204 to energized conductor 53.

The operation of transfer relay 190 in this manner effects the opening of normally closed contacts 191 through 194 and the closure of contacts 195 through 198.

Assuming further that a defect occurs in the strip 10 which permits light rays from the lamps 15 to impinge upon the photo-cell 16, the defect detecting means 14 is operated, as previously described, to effect the energization of control relay 60. Winding 64 of the electromagnet 65 is energized, as previously described, and one or more pins 69 of the pin wheel 70 are depressed.

The depressed pin or pins first move cam 76. However, no action takes place as a result of movement of cam 76 because the circuits through contacts 78 and 79 are opened at contacts 191 and 193 of the transfer relay 190. The pins then engage cam 76' and as a result contact 78' is moved into engagement with stationary contact 80' A circuit is then completed for energizing winding 82 of holding relay 84.

This circuit may be traced from energized conductor 53 through conductor 204, contacts 197, conductor 205, movable contact 78', stationary contact 80', conductor 149, contacts 85, conductor 150, and winding 82 to energized conductor 52.

At contacts 85 the previously traced energizing circuit for winding 82 is opened but the relay still remains in the energized condition as set forth hereinbefore.

At contacts 87 of holding relay 84 a circuit is completed for energizing winding 89' of electromagnet 90'. This circuit may be traced from energized conductor 53 through conductor 141, contacts 87, conductor 151, contacts 198, conductor 206, contacts 88' (closed by cam 135' at the instant that the sheet 189 is cut by the knife 170), conductor 152, winding 89', and conductor 207 to energized conductor 52.

It will be observed that winding 89 is connected in parallel circuit relation with winding 89' and that it is energized at the same time. However, no control function is accomplished by sheet recording means 96 since the circuit to its movable contact 103 through conductor 208 is interrupted at contacts 192 of the transfer relay 190.

The cam 93' depresses one or more pins 94' of the pin wheel 95'. Subsequently they engage and operate cam 101' to shift movable contact 103' into engagement with stationary contact 105'. A circuit is then completed for effecting the energization of the sheet director control relay 117 to operate sheet director 47 in the space between the last perfect sheet and the sheet containing the defect which has been detected. The circuit for energizing winding 115 of relay 117 may be traced from energized conductor 53 through contacts 196, conductor 209, movable contact 103', fixed contact 105', conductor 158, contacts 128 (closed on operation of space detecting relay 127), conductor 159, contacts 118, conductor 160, winding 115, and conductor 161 to energized conductor 52.

The operation of the sheet director 47 in response to operation of relay 117 will then be as previously described.

From the foregoing description it will be clear that the strip 10 may be cut into sheets either by the front knife 170 or the back knife 27 and that any defects occurring therein will be detected and the sheets containing the same will be automatically discarded. The operation is entirely automatic. The operator does not have to concern himself with any adjustment of the system.

In Figures 8 and 9 of the drawings the mechanical details of construction of the pin wheel 95 are illustrated. As previously described when front and back strips 169 and 168 are being cut by the knives 27 and 170 duplicate control apparatus is provided for the defect detecting means. Advantage is taken of the fact that the speed at which the strip 10 is fed to the knives 27 and 170 is the same for both strips 168 and 169. Likewise the speed at which the sheets are conveyed away from the knives 27 and 170 is the same for each sheet and, accordingly, advantage is taken of this fact to combine the pin wheels for the otherwise independent defect detecting apparatus for each of the strips. It is for this reason that two pin wheels 95 are illustrated in the housing 215 in Figures 8 and 9 of the drawings. It will be understood that one of the pin wheels 95 corresponds, for example, to the pin wheel 95 shown in Figure 1A of the drawings and that the other pin wheel shown in Figure 8 is provided for cooperating with the defect detecting apparatus associated with the other strip being cut at the same time that the strip is being cut which is associated with the pin wheel 95 shown in Figure 1A.

It is further pointed out that three pin wheels, as illustrated in Figures 2A–2B of the drawings, are provided for each strip being cut into sheets. Thus, when two strips are simultaneously being cut by two knives, as illustrated in Figure 3 of the drawings, there will be six pin wheels. Corresponding pin wheels for each strip can be paired, as illustrated in Figures 8 and 9 of the drawings and commonly driven. The pin wheels may all be identical in construction. However, there is a slight difference in the construction of the parts associated with pin wheel 70 as compared to the parts associated with the pin wheel 95 or 95'. This difference will be pointed out hereinafter.

The frame or housing 215, shown in Figures 8 and 9 of the drawings, is generally circular in construction and may be formed of any suitable material such as a casting. It has side plates 216 and 217 at its ends and has mounted therein a worm 218 that drives a worm wheel 219. The worm 218 may be mounted on the shaft 97 which, it will be recalled, is driven from the delivery roll 43 in accordance with the speed at which the sheets are conveyed away from the knives to the lay boy 46. The worm wheel 219 may be keyed on a shaft 220 that is journaled in suitable bearings 221 in the side plates 216 and 217. The shaft 220 also has keyed thereon the pin wheels 95.

By way of illustration it is pointed out that the pin wheel 95 may have an external diameter of 7⅝" and may be 1" thick at the rim. Sixty-four pins 94 are slidably mounted in the rim of the wheel 95. Their inner ends 222 are convex for engagement by the cam 93 on energization of the electromagnet 90 to depress them from the position shown at the bottom of Figure 8 to that shown at the top. The other ends 223 are flat.

The pins 94 are recessed as indicated at 224 between their ends to provide shoulders for engaging a flexible band 225 that is held in place by a garter spring 226 that is positioned in a slot or groove 227 in the periphery of the wheel 95. The band 225 serves to limit the movement of the pins 94 so as to prevent their being driven through the pin wheel 95 beyond a predetermined extent.

Provision is made for returning the pins 95 from their operated positions by the cam 93 in the form of a return cam 228 which is located slightly ahead of the cam 93 so that the pins 94 will always be returned in readiness for movement by the cam 93 whenever the same is operated.

It will be recalled that the pins 94 which are depressed by the cam 93 serve to engage at their opposite ends the cam 101. This cam is carried by a shaft 102 which has at its outer end an arm 229 that carries an adjusting screw 230 for operating the switch mechanism which is indicated at 231. It will be understood that the switch mechanism 231 comprises the movable contact 103, stationary contacts 104 and 105 and spring 106. Any conventional type of switch mechanism suitable for this purpose can be employed.

The shaft 102 is rockably mounted in a bushing 232 that is carried by a shiftable plate 107, the plate previously referred to whose position is controlled in accordance with the speed of rotation of the knife individual thereto. The plate 107 has a lug 233 radially projecting therefrom to which the rod 108 may be attached.

It will be noted that the shaft 92 which carries the cam 93 projects through the housing 215. The link 91 at its outer end may be connected by suitable means (not shown) to the electromagnet 90 for operation as described hereinbefore.

The description of the pin wheels set forth hereinbefore applies particularly to the pin wheels 95 and 95'. As previously indicated, the pin wheel 70 is identical in construction to that of the pin wheel 95. However, it is unnecessary to provide the shiftable plate 107 for the pin wheel 70 since the distances between the defect detecting means 14 and the knives 27 and 170, Figure 2B, are fixed, rather than variable as is the case with the other pin wheels where the lengths of the sheets are variable. Accordingly, the shiftable plate 107 can be omitted in the mounting for the pin wheel 70. Instead, the cams 76 and 76' and the associated switch mechanisms can be mounted directly on the side plates 216 and 217. It is again pointed out that two pin wheels 70 are provided in the same housing, one for each strip being cut by the front and back knives. Each of the pin wheels 70 will have cams 76 and 76' and the associated contacts in order to permit the use of either the front knife or the back knife for cutting either the front strip or the back strip.

In Figure 10 of the drawings a portion of the carrier 41 is illustrated in greater detail. It will be noted that the delivery belt 40 comprises a plurality of narrow belts. Likewise the delivery belts 44 and 45 comprise a plurality of narrow belts for conveying the sheets to the lay boy 46.

In Figure 10 the sheet director 47 is illustrated in the position for throwing out a sheet 39 which contains a defect 240, the defect 240 in this instance comprising a hole. When the sheet director 47 is operated to the position shown, the sheet 239 is directed to the throw out table 49 and is prevented from being carried by the delivery belts 44 and 45 to the lay boy 46.

It will be observed that a second sheet director 241 is provided for the other sheets and that it can be operated by an electropneumatic operating mechanism 242. It will be understood that a duplicate of the apparatus illustrated in Figures 2A-2B is provided for controlling the functioning of the mechanism 242 for, in turn, controlling the position of the sheet director 241. In Figure 10 sheets 172, which for present purposes are considered as perfect sheets, are being fed over the sheet director 241 and conveyed by delivery belts 44 and 45 to the lay boy 46.

It has been pointed out previously that it is not desired to operate the sheet director 47 or 241 except during the space occurring between the trailing edge of one sheet and the leading edge of the next sheet. If only a single light source 123, mirror 124 and photo-cell 122 were used, a false operation might be permitted in the event that a sheet contains a relatively large tear or hole. It is unlikely that a defect will extend entirely across the sheet or that two defects will occur in the sheet opposite each other. Accordingly, in order to prevent the operation of the sheet director 47, except in the space between the trailing end of one sheet and the leading end of the next sheet, two light sources 123 are provided for cooperating with two mirrors 124 to direct the light rays to photo-cells 122. The contacts of the relays 127 operated by the two photo-cells 122 are individually connected in series circuit relation so that the energization of both of the space detecting relays 127 is required before the sheet director control relay 117 can be energized.

Likewise, two light sources 243 are provided for cooperating with mirrors 244 and photo-cells 245 to control the functioning of mechanism 242 which operates the sheet director 241.

From the foregoing description it will be apparent that I have provided a control system for detecting defects in strips, such as strips of paper and for determining the particular sheet or sheets in which the defects are present and which sheets should be discarded. The system is flexible in that two strips can be cut at the same time by two individually operable knives which can operate at different speeds to cut sheets of different lengths. Either the front knife or the back knife can cut either the front strip or the back strip and provision is made for automatically shifting the controls in accordance with the knife that is used to cut a particular strip.

Since certain further changes can be made in the foregoing construction and system and different embodiments of the invention can be made without departing from the spirit and scope thereof, it is intended that all matter shown in the accompanying drawings and described hereinbefore shall be interpreted as illustrative and not in a limiting sense.

I claim as my invention:

1. Apparatus for automatically throwing out sheets of paper or the like containing defects, the sheets being cut by a rotary knife from a strip that is fed thereto at a predetermined speed and being conveyed away therefrom by delivery means at a higher speed, comprising, in combination, strip recording means driven in accordance with the speed at which the strip is fed to said knife, means for detecting the presence of a defect in said strip at a position several sheet lengths in advance of said knife and registering the same on said recording means, a holding relay, switch means operated by said strip recording means when said defect reaches a predetermined position relative to said knife for energizing said holding relay, sheet recording means driven in accordance with the speed at which the sheets are conveyed away by said delivery means, means operated by said holding relay for registering on said sheet recording means the sheet containing the defect, a sheet director cooperating with said delivery means to throw out sheets containing defects, and switch means operated by said sheet recording means when said sheet containing the defect reaches a predetermined position in advance of said sheet director, for effecting operation thereof to its throw out position, whereupon said sheet is discarded.

2. The invention, as set forth in claim 1, wherein means are provided for preventing operation of the sheet director until the same can be operated in the space between the leading edge of the sheet containing the defect and the trailing edge of the sheet in advance thereof.

3. The invention, as set forth in claim 1, wherein the defect detecting means comprises a light source on one side of the strip, and light sensitive means on the opposite side thereof.

4. The invention, as set forth in claim 1, wherein the defect detecting means comprises a light source extending transversely of one side of said strip, and light sensitive means on the opposite side thereof located at the focal point of a parabolic reflector.

5. The invention, as set forth in claim 1, wherein the strip recording means comprises a wheel having a plurality of transversely shiftable pins near its periphery, a cam depresses one or more pins in response to operation of the defect detecting means whereby the defect is registered, and a cam is moved by the depressed pin or pins to operate the switch for energizing the holding relay.

6. The invention, as set forth in claim 1, wherein a switch is operated when the sheet containing the defect is cut from the strip by the knife to complete the circuit through the holding relay for registering said sheet on the sheet recording means.

7. The invention, as set forth in claim 1, wherein the sheet recording means comprises a wheel having a plurality of transversely shiftable pins near its periphery, a cam depresses one or more of the pins in response to operation of the holding relay whereby the sheet containing the defect is registered thereon, and a cam is moved by the depressed pin or pins to operate the switch means for effecting operation of the sheet director.

8. The invention, as set forth in claim 1, wherein the sheet recording means comprises a wheel having a plurality of transversely shiftable pins near its periphery, a cam depresses one or more of the pins in response to operation of the holding relay whereby the sheet containing the defect is registered thereon, a cam is moved by the depressed pin or pins to operate the switch means for effecting operation of the sheet director, and means are provided for changing the arcuate distance between said cams in accordance with the length of the sheets being cut by the knife.

9. The invention, as set forth in claim 1, wherein the sheet recording means comprises a wheel having a plurality of transversely shiftable pins near its periphery, a cam depresses one or more of the pins in response to operation of the holding relay whereby the sheet containing the defect is registered thereon, a cam is moved by the depressed pin or pins to operate the switch means for effecting operation of the sheet director, and means are provided for changing the arcuate distance between said cams in accordance with the speed at which the knife revolves.

10. The invention, as set forth in claim 1, wherein means are provided for preventing operation of the sheet director until the same can be operated in the space between the leading edge of the sheet containing the defect and the trailing edge of the sheet in advance thereof comprising a light source, and light sensitive means so positioned relative thereto that light rays from the former impinge upon the latter only when said space is in a predetermined location.

11. Apparatus for automatically throwing out sheets of paper or the like containing defects, the sheets being cut by either a front or a back rotary knife disposed in tandem with the back knife nearer to the source of the sheets from a strip that is fed thereto at a predetermined speed and being conveyed away therefrom by delivery means at a higher speed, comprising, in combination, strip recording means driven in accordance with the speed at which the strip is fed to the knife cutting the same, means for detecting the presence of a defect in said strip at a position several sheet lengths in advance of said back knife and registering the same on said recording means, a holding relay, switch means individual to each knife disposed to be operated by said strip recording means when said defect reaches a predetermined positioned relative to the knife being used for energizing said holding relay, sheet recording means individual to each knife and driven in accordance with the speed at which the sheets are conveyed away by said delivery means, means operated by said holding relay for registering on said sheet recording means the sheet containing the defect, a sheet director cooperating with said delivery means to throw out sheets containing defects, switch means operated by each sheet recording means when said sheet containing the defect reaches a predetermined position in advance of said sheet director for effecting operation thereof to its throw out position, whereupon said sheet is discarded, and transfer switch means operable from one position to another to shift the control of said holding relay from one of said switch means operated by said strip recording means to the other and to shift the control of said sheet director from one of said switch means operated by the corresponding sheet recording means to the other.

12. The invention, as set forth in claim 11, wherein the transfer switch means is electromagnetically operated and a switch controls the operation thereof in accordance with whether the sheets are cut by the front or the back knife.

13. The invention, as set forth in claim 11, wherein means are provided for preventing operation of the sheet director until the same can be operated in the space between the leading edge of the sheet containing the defect and the trailing edge of the sheet in advance thereof.

14. The invention, as set forth in claim 11, wherein two strips are fed simultaneously to the knives, one to the back knife and the other to the front knife; and the defect detecting means comprises a light source extending transversely of one side of the strip, and light sensitive means on the opposite side individual to each strip and located at the focal point of a parabolic reflector.

15. The invention, as set forth in claim 11, wherein two strips are fed simultaneously to the knives, one to the back knife and the other to the front knife; the defect detecting means comprises a light source extending transversely of one side of the strip, and light sensitive means on the opposite side individual to each strip and located at the focal point of a parabolic reflector; and means are provided for varying the length of the opening of each reflector through which the rays from said source pass to correspond to the width of the strip individual thereto.

16. The invention, as set forth in claim 11, wherein the strip recording means comprises a wheel having a plurality of transversely shiftable pins near its periphery, a cam depresses one or more pins in response to operation of the defect detecting means whereby the defect is registered, and a pair of cams is arcuately spaced from each other and from the first mentioned cam around said wheel and they are sequentially moved by the depressed pin or pins to operate the switch means individual to each knife for energizing the holding relay, the arcuate distance between said first mentioned cam and each of said pair of cams corresponding to the length of the strip between said defect detecting means and the knife associated with the corresponding cam of said pair of cams.

17. The invention, as set forth in claim 11, wherein a switch is operated when the sheet containing the defect is cut from the strip by the knife associated therewith to complete the circuit through the holding relay for registering said sheet on the sheet recording means individual to said knife.

18. The invention, as set forth in claim 11, wherein each sheet recording means comprises a wheel having a plurality of transversely shiftable pins near its outer periphery, a cam depresses one or more of the pins in response to operation of the holding relay whereby the sheet containing the defect is registered, and a cam is moved by the depressed pin or pins to operate the switch means for effecting operation of the sheet director.

19. The invention, as set forth in claim 11, wherein each sheet recording means comprises a wheel having a plurality of transversely shiftable pins near its outer periphery, a cam depresses one or more of the pins in response to operation of the holding relay whereby the sheet containing the defect is registered, a cam is moved by the depressed pin or pins to operate the switch means for effecting operation of the sheet director, and means are provided for changing the arcuate distance between said cams in accordance with the length of the sheets being cut by the associated knife.

20. The invention, as set forth in claim 11, wherein a single strip is cut to form two strips and they are fed simultaneously to the knives, and the apparatus recited in claim 16 is duplicated for each strip.

LAWRENCE A. MOORE.

REFERENCES CITED

The following references are of record in the file of this patent:

UNITED STATES PATENTS

| Number | Name | Date |
| --- | --- | --- |
| Re. 19,989 | Swift | Mar. 26, 1936 |
| 2,229,638 | Chamberlin | Jan. 28, 1941 |
| 2,286,686 | Muddiman | June 16, 1942 |
| 2,318,937 | Goldney | May 11, 1943 |
| 2,363,577 | Dexter | Nov. 28, 1944 |
| 2,395,482 | Hurley | Feb. 26, 1946 |

FOREIGN PATENTS

| Number | Country | Date |
| --- | --- | --- |
| 405,243 | Great Britain | Apr. 28, 1932 |